(12) United States Patent
Silverstein et al.

(10) Patent No.: US 7,791,597 B2
(45) Date of Patent: Sep. 7, 2010

(54) UNIQUELY IDENTIFIABLE INKING INSTRUMENTS

(75) Inventors: Dana Lu Silverstein, Duvall, WA (US); Duncan, Camano Island, WA (US); Manolito E. Adan, Woodinville, WA (US); Nigel Stuart Keam, Redmond, WA (US); Robert Brigham, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 657 days.

(21) Appl. No.: 11/382,812

(22) Filed: May 11, 2006

(65) Prior Publication Data

US 2007/0188478 A1 Aug. 16, 2007

Related U.S. Application Data

(63) Continuation-in-part of application No. 11/351,295, filed on Feb. 10, 2006.

(51) Int. Cl.
G06F 3/033 (2006.01)
G09G 5/00 (2006.01)
(52) U.S. Cl. .................... 345/179; 345/156
(58) Field of Classification Search ............. 345/175, 345/179–183
See application file for complete search history.

(56) References Cited

U.S. PATENT DOCUMENTS

| | | | |
|---|---|---|---|
| 4,190,831 A | 2/1980 | Stahle | |
| 4,814,552 A | 3/1989 | Stefik | |
| 5,070,344 A | 12/1991 | Gascuel | |
| 5,646,650 A * | 7/1997 | Miller et al. | 345/179 |
| 5,661,508 A | 8/1997 | Lazzouni | |
| 5,959,616 A * | 9/1999 | Challener | 345/179 |
| 5,999,171 A | 12/1999 | Goff | |
| 6,154,200 A * | 11/2000 | Challener et al. | 345/180 |
| 6,188,388 B1 * | 2/2001 | Arita et al. | 345/158 |
| 6,509,922 B2 | 1/2003 | Fujita | |

(Continued)

FOREIGN PATENT DOCUMENTS

EP 309654 A2 * 4/1989

OTHER PUBLICATIONS

Office Action dated Jul. 8, 2009 cited in U.S. Appl. No. 11/351,295.

(Continued)

*Primary Examiner*—Bipin Shalwala
*Assistant Examiner*—Ilana Spar
(74) *Attorney, Agent, or Firm*—Workman Nydegger

(57) ABSTRACT

A method of interacting with a computing device via one or more inking instruments to generate digital ink may include the steps of emitting light from a light emitting device to an inking instrument, receiving first user inputs from the inking instrument, and identifying the inking instrument based on sensed light reflected from the inking instrument. Another method may include the steps of simultaneously detecting first user inputs from a first inking instrument and second user inputs from a second inking instrument by receiving first light emitted from the first inking instrument and second light emitted from a second inking instrument that each have one or more identifying characteristics, identifying the inking instrument based on their identifying characteristics, and generating corresponding digital ink. These methods may be implemented via computer-executable instructions and may be used with a horizontally-placed display, tablet-based laptop computers, and passive or active digital inking instruments.

8 Claims, 11 Drawing Sheets

U.S. PATENT DOCUMENTS

| | | | |
|---|---|---|---|
| 6,592,039 | B1 | 7/2003 | Smith |
| 6,650,320 | B1 | 11/2003 | Zimmerman |
| 6,801,211 | B2 | 10/2004 | Forsline |
| 7,204,428 | B2 * | 4/2007 | Wilson ............. 235/494 |
| 7,219,233 | B1 | 5/2007 | Hendriks |
| 2002/0180700 | A1 * | 12/2002 | Clapper ............. 345/158 |
| 2003/0066691 | A1 | 4/2003 | Jelinek |
| 2003/0213314 | A1 | 11/2003 | De Schrijver |
| 2006/0007123 | A1 * | 1/2006 | Wilson et al. ............. 345/156 |
| 2006/0084039 | A1 * | 4/2006 | Ryokai et al. ............. 434/155 |
| 2006/0244719 | A1 * | 11/2006 | Brigham et al. ............. 345/156 |

OTHER PUBLICATIONS

Office Action dated Sep. 24, 2009 cited in U.S. Appl. No. 11/351,295.
Jayshree Subrahmonia et al., "Pen Computing: Challenges and Applications", 2000 IEEE, pp. 60-66.
Tamas Sziranyi et al., "Random Paintbrush Transformation", 2000 IEEE, pp. 151-154.

* cited by examiner

UNIQUELY IDENTIFIABLE INKING INSTRUMENTS

BACKGROUND

A variety of data entry techniques have been developed to enhance usability and to make computers more versatile. A typical computing environment, especially a computing environment incorporating graphical user interfaces for user interaction, may be optimized for accepting input from one or more discrete input devices. As an example, an individual may enter characters (i.e., text, numerals, and symbols) with a keyboard and control the position of a pointer image on a display with a pointing device, such as a mouse or trackball. A computing environment incorporating graphical user interfaces may also accept input though one or more natural input methods, including speech input methods and handwriting input methods. With handwriting input methods, a pen-like stylus may be utilized to serve the general purpose of a pointing device and to create electronic ink.

Conventional stylus-based input devices are passive or active. A conventional passive stylus provides a tip that applies pressure to the surface of a touch screen apparatus. A conventional active stylus includes electronics that interact with its computing environment to determine the location of the stylus on the writing surface, which rely upon acoustic, magnetic or induction technology to determine the location information.

Conventional computing systems that interact with stylus-based input devices are designed to accept input from a single stylus-based input device at a given time. These conventional systems do not uniquely identify individual stylus-based passive input devices. Further, these conventional systems do not react differently to inputs from different passive stylus-based input devices, such as providing different types of digital ink, depending upon the input device being used.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

A method of interacting with a computing device via one or more inking instruments to generate digital ink is generally provided. The method may include the steps of emitting light from a light emitting device to an inking instrument, receiving first user inputs from the inking instrument, and identifying the inking instrument based on sensed light reflected from the inking instrument.

Another method may include the steps of simultaneously detecting first user inputs from a first inking instrument and second user inputs from a second inking instrument by receiving first light emitted from a first inking instrument and second light emitted from a second inking instrument that each have an identifying characteristic, identifying the inking instrument based on their identifying characteristics, and generating digital ink that corresponds to the respective inking instrument.

These methods may be implemented via computer-executable instructions, and may be used with a horizontally-placed display. For example, the display may be installed as a tabletop, with users sitting around the periphery. These methods may also be used with other computing devices that can interact with digital inking instruments, such as tablet-based laptop computers or whiteboards, and may be used with passive or active digital inking instruments. These and other features will be described in greater detail below.

DETAILED DESCRIPTION

Figure 1:
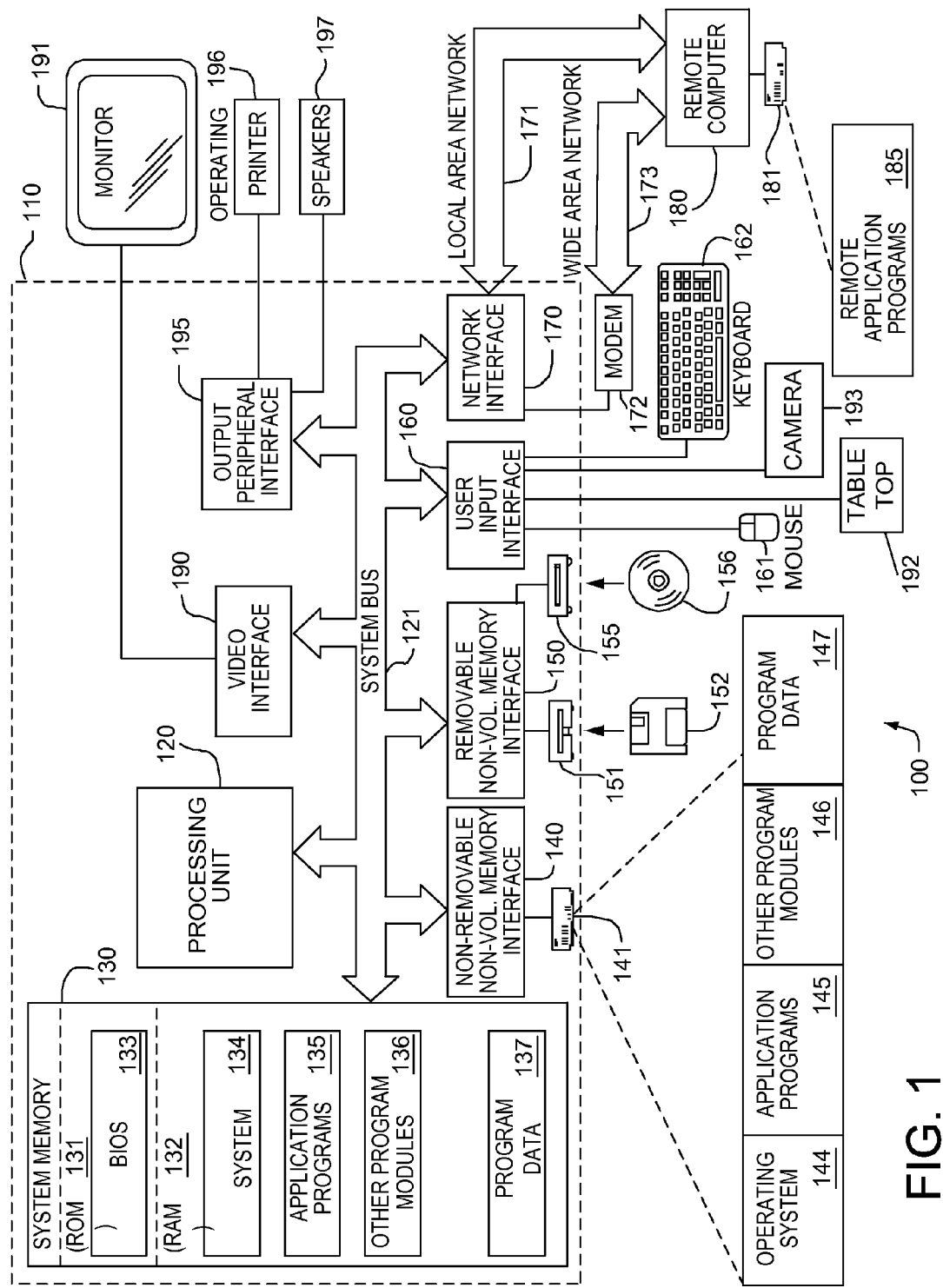
FIG. 1 illustrates an example of a computing system environment.

FIG. 1 illustrates an example of a suitable computing system environment 100 on which the features herein may be implemented. The computing system environment 100 is only one example of a suitable computing environment and is not intended to suggest any limitation as to the scope of use or functionality of the features described herein. Neither should the computing environment 100 be interpreted as having any dependency or requirement relating to any one or combination of components illustrated in the exemplary operating environment 100.

The features herein are described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the features may be practiced with other computer system configurations, including hand-held devices, multiprocessor systems, microprocessor-based or programmable consumer electronics, minicomputers, mainframe computers, and the like. The features may also be practiced in distributed computing environments where tasks are performed by remote processing devices that are linked through a communications network. In a distributed computing environment, program modules may be located in both local and remote computer storage media including memory storage devices.

With reference to FIG. 1, the exemplary system 100 for implementing features described herein includes a general purpose-computing device in the form of a computer 110 including a processing unit 120, a system memory 130, and a system bus 121 that couples various system components including the system memory to the processing unit 120.

Computer 110 may include a variety of computer readable media. By way of example, and not limitation, computer readable media may comprise computer storage media and communication media. The system memory 130 may include computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, may be stored in ROM 131. RAM 132 may contain data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 may be connected to the system bus 121 through a non-removable memory interface such as interface 140, and magnetic disk drive 151 and optical disk drive 155 may be connected to the system bus 121 by a removable memory interface, such as interface 150.

The drives and their associated computer storage media discussed above and illustrated in FIG. 1 may provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. The video interface 190 may be bidirectional, and may receive video input from sensors associated with the monitor 191. For example, the monitor 191 may be touch and/or proximity sensitive, such that contacts to a monitor surface may be used as input data. The input sensors for affecting this could be a capacitive touch sensitive device, an array of resistive contact sensors, an optical sensor or camera, or any other desired sensor to make the monitor 191 touch and/or proximity sensitive. In an alternative arrangement, or in addition, a touch and/or proximity sensitive input system may be separate from monitor 191, and may include a planar surface such as a table top 192 and any applicable sensing systems to make the planar surface touch sensitive, such as camera 193. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 may be connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used. Many of the features described herein may be implemented using computer-executable instructions stored on one or more computer-readable media, such as the media described above, for execution on the one or more units that make up processing unit 120.

Figure 2:
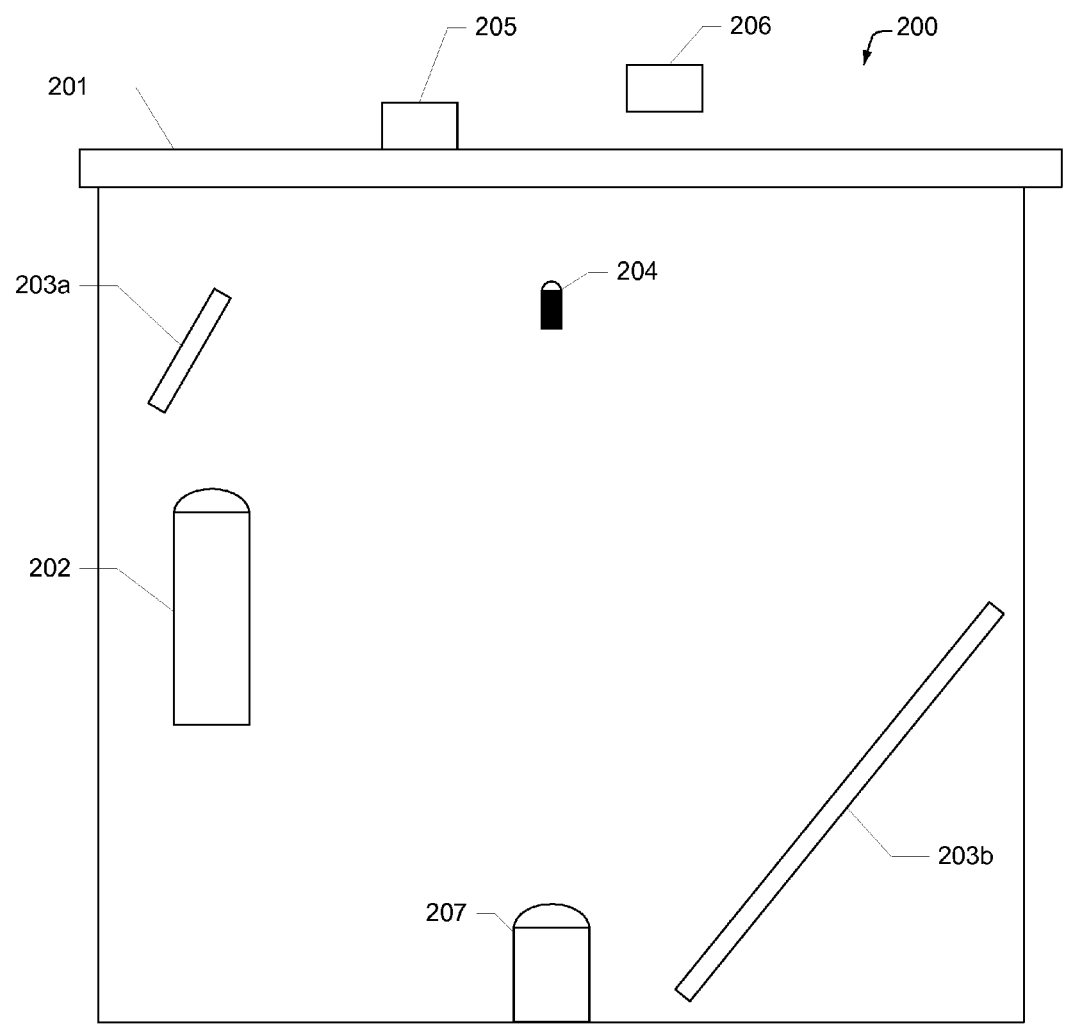
FIG. 2 illustrates an interactive table environment and interface.

The computing device shown in FIG. 1 may be incorporated into a system having table display device 200, as shown in FIG. 2. The display device 200 may include a display surface 201, which may be a planar surface such as a table top. As described hereinafter, the display surface 201 may also help to serve as a user interface.

The display device 200 may display a computer-generated image on its display surface 201, which allows the device 200 to be used as a display monitor for computing processes, displaying television or other visual images, video games, and the like. The display may be projection-based, and may use a digital light processing (DLP) technique, or it may be based on other display technologies, such as liquid crystal display (LCD) technology. A projector 202 may be used to project light onto the underside of the display surface 201. It may do so directly, or may do so using one or more mirrors. As shown in FIG. 2, the projector 202 projects light for a desired image onto a first reflective surface 203a, which may in turn reflect light onto a second reflective surface 203b, which may ultimately reflect that light onto the underside of the display surface 201, causing the surface 201 to emit light corresponding to the desired display.

In addition to being used as an output display for displaying images, the device 200 may also be used as an input-receiving device. As illustrated in FIG. 2, the device 200 may include one or more light emitting devices 204, such as IR light emitting diodes (LEDs), mounted in the device's interior. The light from devices 204 may be projected upwards through the display surface 201, and may reflect off of various objects that are above the display surface 201. For example, one or more objects 205 may be placed in physical contact with the display surface 201. One or more other objects 206 may be placed near the display surface 201, but not in physical contact (e.g., closely hovering). The light emitted from the emitting device(s) 204 may reflect off of these objects, and may be detected by one or more cameras 207, which may include one or more infrared (IR) cameras if IR light is used. The signals from the one or more cameras 207 may then be forwarded to a computing device (e.g., the device shown in FIG. 1) for processing, which, based on various configurations for various applications, may identify the object and its orientation (e.g. touching or hovering, tilted, partially touching, etc.) based on its shape and the amount/type of light reflected.

To assist in identifying the objects 205, 206, the objects may include a reflective pattern, such as a bar code, on their lower surface. To assist in differentiating objects in contact 205 from hovering objects 206, the display surface 201 may include a translucent layer that diffuses emitted light. Based on the amount of light reflected back to the camera 207 through this layer, the associated processing system may determine whether an object is touching the surface 201, and if the object is not touching, a distance between the object and the surface 201. Accordingly, various physical objects (e.g., fingers, elbows, hands, stylus pens, blocks, etc.) may be used as physical control members, providing input to the device 200 (or to an associated computing device).

The device 200 shown in FIG. 2 is illustrated as using light projection and/or sensing techniques for the display of data and the reception of input, but other techniques may be used as well. For example, stylus-sensitive displays are currently available for use with Tablet-based laptop computers, and such displays may be used as device 200. Additionally, stylus- and touch-sensitive displays are available with many personal data assistants (PDAs), and those types of displays may also be used as device 200.

The device 200 is also shown in a substantially horizontal orientation, with the display surface 201 acting as a tabletop. Other orientations may also be used. For example, the device 200 may be oriented to project a display onto any desired surface, such as a vertical wall. Reflective IR light may also be received from any such oriented surface.

Figure 3:
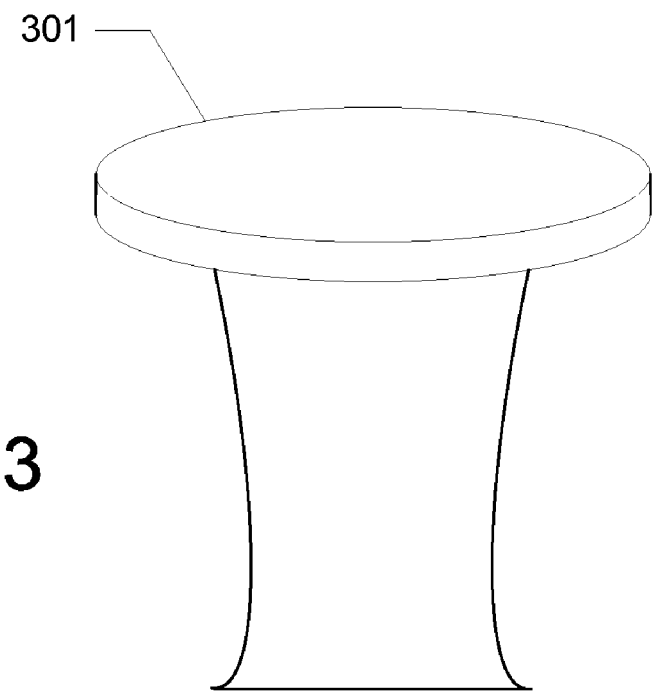
FIG. 3 illustrates an example of an interactive display.
Figure 4:
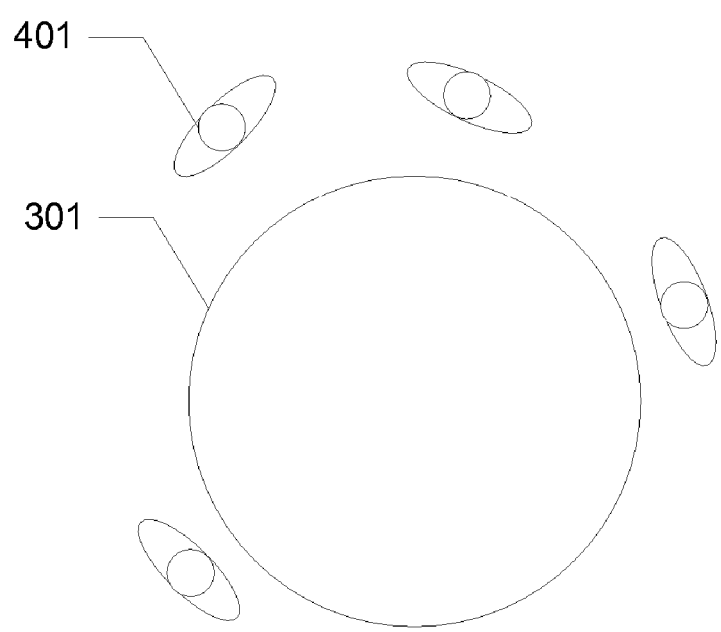
FIG. 4 illustrates a top view of the display from FIG. 3.

FIG. 3 illustrates an illustrative configuration of an implementation of the system shown in FIG. 2, in which device 301 is used as a tabletop display device. FIG. 4 illustrates an overhead view of such a table, around which a number of users 401 may be seated or standing. Each user 401 may wish to interact with the display on the surface of table 301, for example to draw, place and/or touch an object, or to play a party video game.

Figure 5:
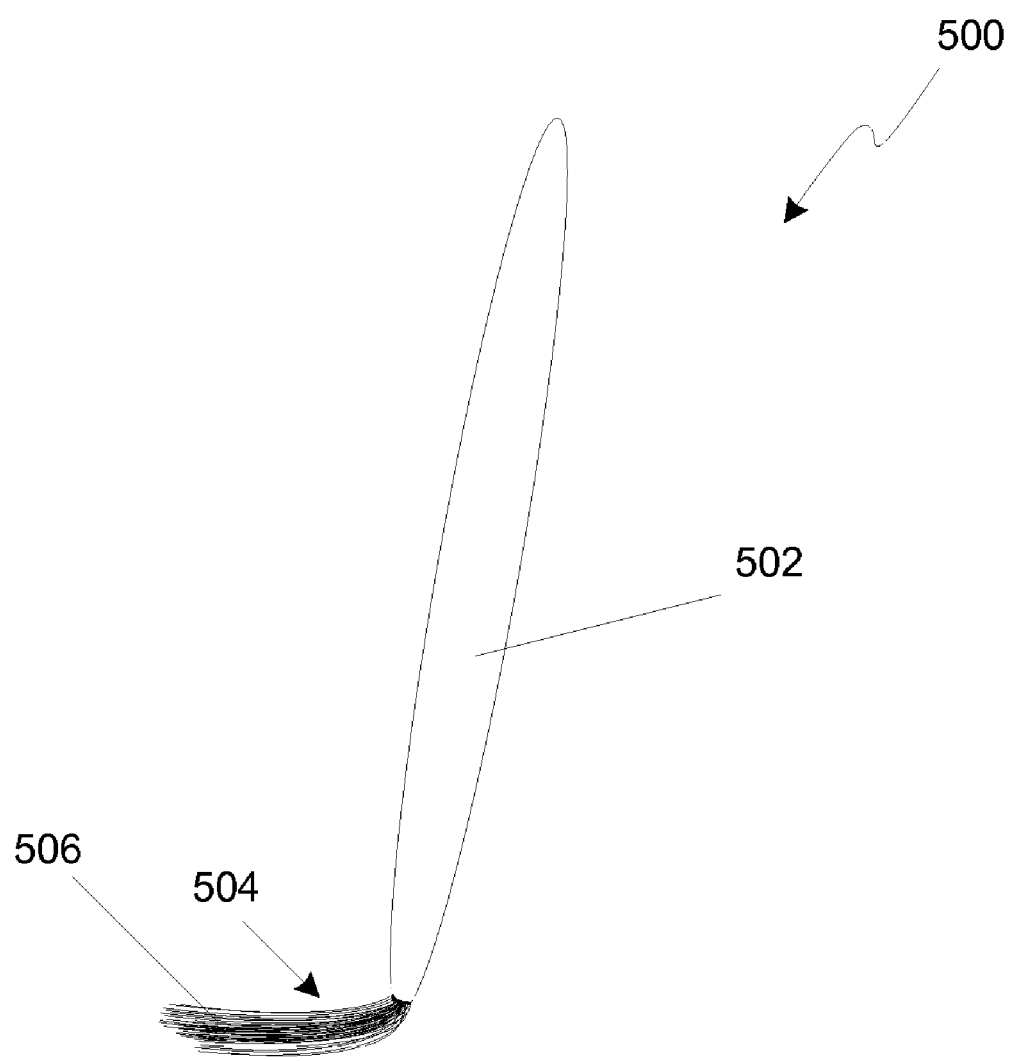
FIG. 5 illustrates an example passive digital inking instrument.

FIG. 5 illustrates a passive digital inking instrument 500 that can be used as an input device along with the system shown in FIG. 2. Although inking instrument 500 is electronically passive and generally does not electronically interact with computer system 200, it can be uniquely identified by the computer system based upon its vision properties. Inking instrument 500 reacts to the light emitted from the one or more of the light emitting devices 204 of computing system 200 and, thereby, provides light that has one or more identifying characteristics to the one or more cameras 207. For example, inking instrument 500 may reflect the emitted light (or certain wavelengths of the emitted light) at a particular reflectivity, or within a particular range of reflectivities, such that the amount of the reflected light is an identifying characteristic for the inking instrument. In one configuration, inking instrument 500 has a reflectivity within a particular range for a particular wavelength of light emitted from the one or more light emitting devices 204. The computing system can, thereby, identify inking instrument 500 based on the amount of light emitted from emitting device 204 that is reflected by the inking instrument to camera 207.

As an example, light emitting device 204 can emit infrared light at 850 nm through the display surface 201 to inking instrument 500. It may be desirable for light emitting device 204 to emit light at a wavelength that is not visible by humans, but that is recognizable by camera 207, so that it does not affect the viewable image displayed on display surface 201. For example, it may be desirable for the light emitting device to emit light within the infrared light range. A tip portion 504 of the inking instrument can reflect a portion of the emitted light (e.g., 50%-60%), which can be sensed by camera 207. Computing system can identify inking instrument by the amount of light it reflects. In one configuration, computing system 200 can uniquely identify inking instrument based on a calculated reflectivity for the instrument (e.g., if the ratio of the amount of reflected light to the amount of emitted light is 55% plus or minus 5%). In another configuration, it may do so based on the amount of sensed reflected light being greater than or less than a threshold value (e.g., it is less than 60% of the amount of emitted light.)

As shown in FIG. 5, instrument 500 includes a handle 502 and a tip portion 504 having bristles 506 extending therefrom. The bristles are configured to have a desired range of reflectivity properties for one or more wavelengths of light, which permits the instrument to be uniquely identified by the computing system and can permit two or more of the instruments having different properties to be simultaneously and uniquely identified by the system. For example, two users of computing system 200 using different inking instruments 500 that have different reflectivities could simultaneously use the computing systems without their inputs being confused by the system.

The reflectivity of inking instrument 500 for particular wavelengths can be configured as desired based on the properties of bristles 506. A wide variety of materials may be used to provide the desired reflectivity at tip portion 504, which may or may not include bristles. For example, various types of foam materials may be placed at tip portion 504 to provide an interface with the table top/writing surface 201 and to provide a desired reflectivity. Further, various types of bristle materials may be used, such as synthetic materials (e.g., nylon and polyester) and natural materials (e.g., pony, ox, hog or camel hair). The materials may be treated with colorants or other chemicals to increase or decrease their reflectivity as desired for one or more wavelengths of light. The number of uniquely identifiable inking instruments 500 that could be used with a particular computing system may depend upon the sensitivity of the device receiving reflected light from the inking instrument, the power of the illumination source(s) for a particular computing system, the number of different illumination source wavelengths, and vision characteristics of the inking instruments (e.g., their reflectivity.)

Figure 6A:
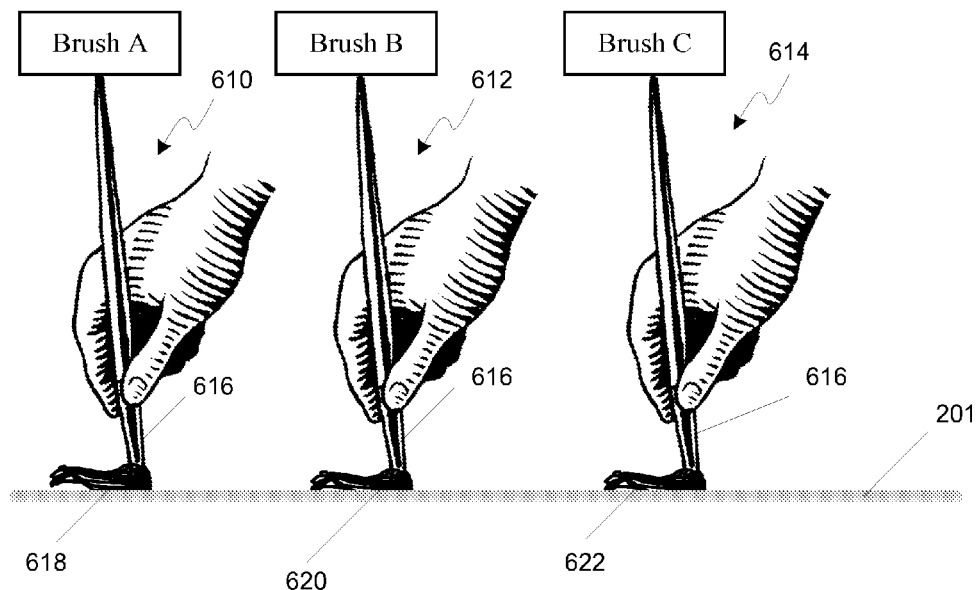
FIGS. 6A and 6B illustrate an example method of interacting with a computing device, such as the interactive table environment and interface of FIG. 2, via one or more inking instruments, such as the passive digital inking instrument of FIG. 5.
Figure 6B:
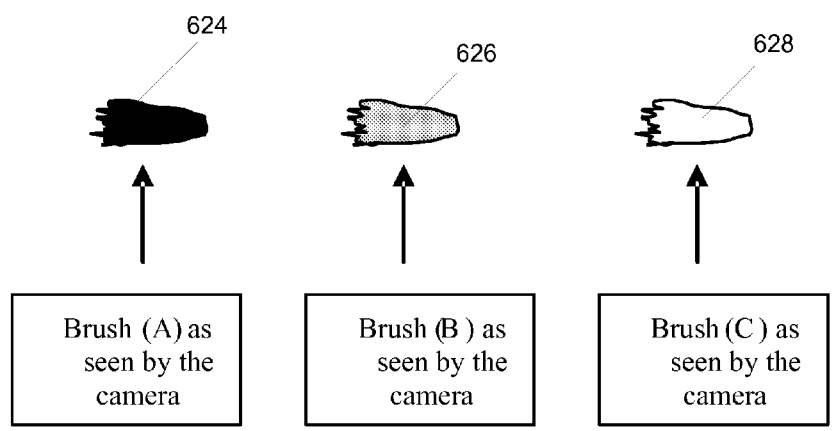

FIGS. 6A and 6B illustrate example configurations and methods of interacting with computing device 200 via a plurality of passive digital inking instruments similar to inking instrument 500, but which have differing vision characteristics. The example inking instruments include Brush A 610, Brush B 612 and Brush C 614 having different vision characteristics for one or more wavelengths of light emitted from emitting device 204. Each of these instruments includes a handle 616 for the user to grip and a tip portion 618, 620 or 622. The tip portions have differing reflectivities for a given wavelength of light, which permits them to be uniquely identified by computing system 200.

As an example configuration, which may be according to FIG. 6A, assume emitting device 204 emits infrared light having a wavelength of 850 nm toward tabletop 201. Assume further that Brush A has a reflectivity between 50%-60% for that wavelength of light, Brush B has a reflectivity between 70%-80%, and Brush C has reflectivity between 90%-100%. For such an example configuration, Brush A may include highly reflective synthetic bristles, such as nylon or polyester, or highly reflective natural bristles, such as hog hair. Brush B may include moderately reflective natural bristles, such as pony, ox or camel hair bristles. Further, Brush C may include foam or another material having relatively low reflectivity. All three of these brushes may simultaneously be placed on table top 201 and, thereby, reflect the infrared light from emitting device 204 to camera 207.

As shown in FIG. 6B, the system senses the inking instruments 610, 612 and 614 differently depending on the amount of infrared light at 850 nm that is reflected by each instrument and sensed by camera 207. Brush A has the highest reflectivity and, thus, camera 207 senses more light for image 624 reflected by Brush A than the other inking instruments. Brush B has the next highest reflectivity and, thus, camera 207 senses less light for image 626 as reflected by Brush B. Similarly, the camera senses the least amount of light for image 628 reflected by Brush C. Based on the amount of light sensed for each of these images, computing system 200 is able to identify each of these images as corresponding to different inking instruments.

Unique identification of different inking instruments provides various advantages. For example, it permits computing system 200 to uniquely mark or identify the digital ink created via inputs from each inking instrument as corresponding to the particular instrument. In the example above, Brushes A, B and C may each generate different colors of digital ink on computing system 200 according to user preferences and/or system settings for the computing system. The brushes may be used by a single user who desires to use different inking instruments depending on the desired characteristics for the ink. For instance, the user may use a first instrument (e.g., Brush A) to create digital ink having a first characteristic, such as one or more of a first desired color, texture, style, weight for the digital ink. The user may use a second instrument (e.g., Brush B) to create ink having a second characteristic and a third instrument (e.g., Brush C) to create ink having a third characteristic. The user can interact with computing system 200 to identify desired ink characteristics for different inking instruments.

The brushes may also be used simultaneously by a single user or by multiple users. When used by multiple users, marking the digital ink (e.g., by color, weight or style) according to the particular inking instrument permits the users to easily identify their personal inputs. This may be particularly beneficial in a group setting, such as during game play with computing system 200. Further, uniquely identifying inputs according to the inking instrument may be beneficial for identifying which inputs were made by whom, such as who was the first person to select a particular object on the table top during game play.

Figure 7:
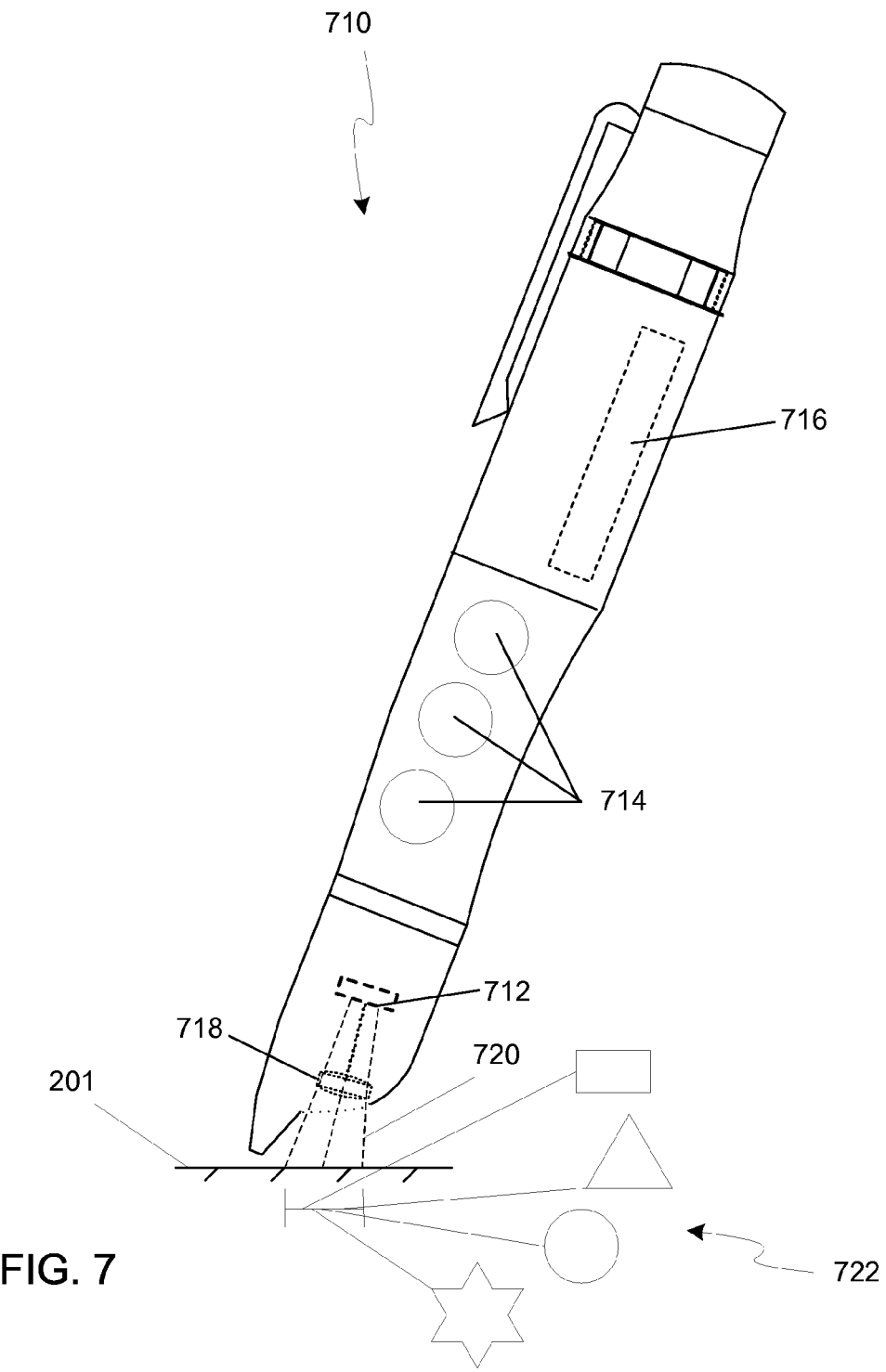
FIG. 7 illustrates an example active digital inking instrument.

FIG. 7 illustrates an example active digital inking instrument in the form of a light pen 710 that can be uniquely identified by computing system 201 via one or more characteristics of the light being emitted from the inking instrument. As shown, pen 710 can include a light source 712, optional inputs (e.g., buttons) 714 for changing one or more characteristics of the emitted light, a power supply 716, and a filter mechanism 718. The various components may be electrically coupled as necessary using, for example, a bus (not shown). The power supply 716 may be incorporated into the inking instrument or may externally be provided via an electrical connection with the host computing system 200. The pen may include a processor (not shown) or other mechanical or electronic components that can permit the user to select and change characteristics of the emitted light. Alternatively, the pen may only provide emitted light having one or more preset characteristics.

Light source 712 may be fixed light source that emits a particular amount of light of a certain wavelength or a range of wavelengths. In addition, light source 712 may have variable settings to produce light at differing power levels, wavelengths, etc. Filter mechanism 718 may be a cut filter to permit the light pen to emit light 720 in a particular geometric shape (e.g., a rectangle, triangle, circle, etc.) 722. Filter mechanism may also include optical filters to permit certain wavelengths of light to be emitted from the light pen while restricting other wavelengths. Optional inputs 714 may be used to change the settings of the light source for a variable light source configuration and/or to adjust characteristics of the filter mechanism (e.g., to select a particular shape or wavelength).

Figure 8A:
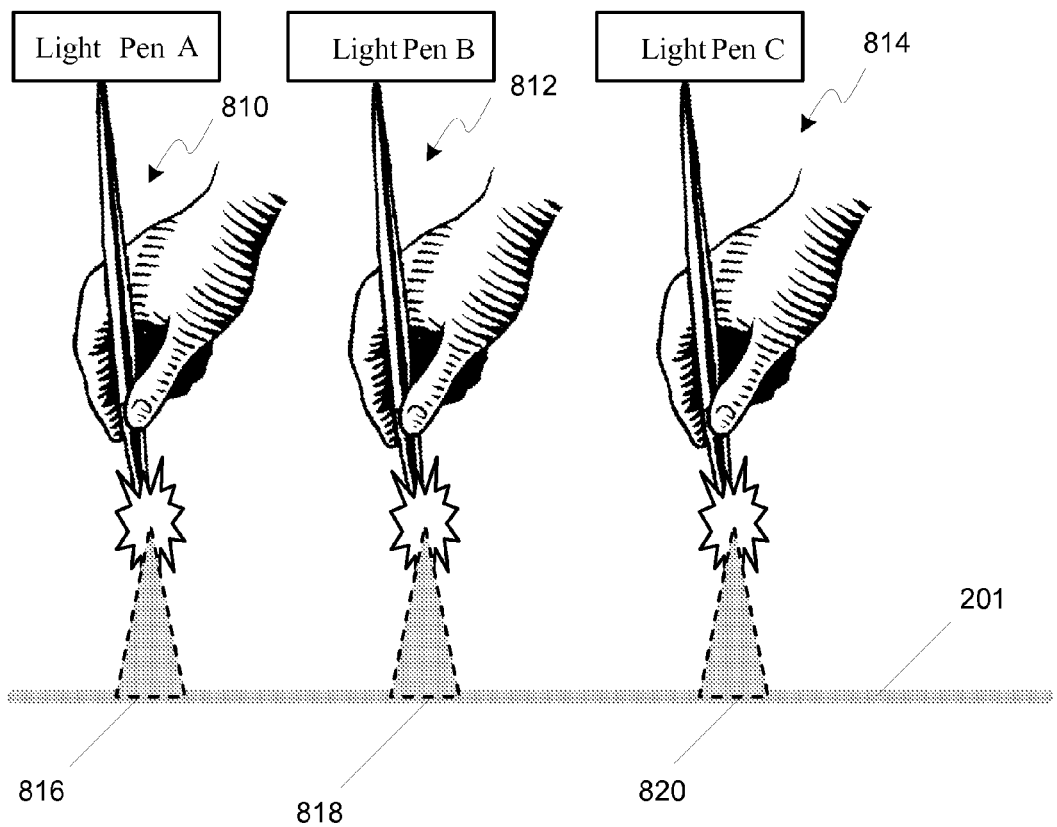
FIGS. 8A and 8B illustrate an example method of interacting with a computing device, such as the interactive table environment and interface of FIG. 2, via one or more active digital inking instruments, such as the active digital inking instrument of FIG. 7.
Figure 8B:
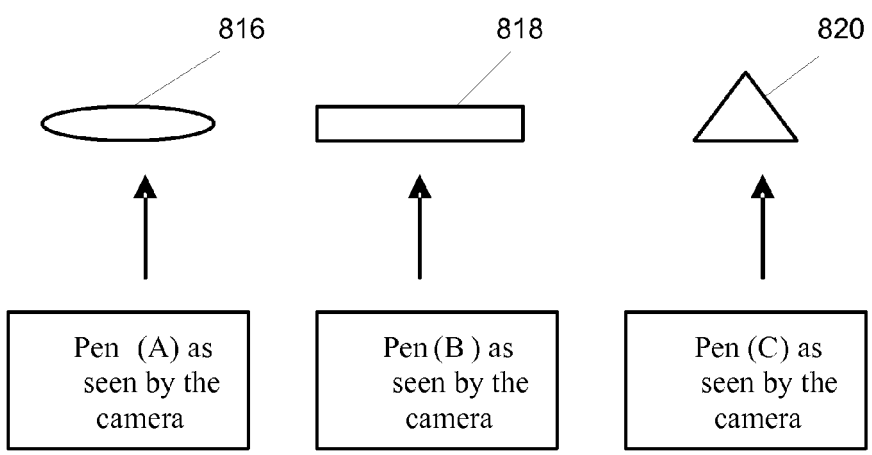

FIGS. 8A and 8B illustrate an example method of interacting with a computing device, such as computing device 200, via one or more active digital inking instruments, such as the active digital inking instrument of FIG. 7. Suppose, as an example, that multiple light pens 710 are configured to form Light Pen A 810 emitting infrared light in the shape of an oval 816, Light Pen B 812 emitting infrared light in a rectangular shape 818, and Light Pen C 814 emitting infrared light in a triangular shape 820. As shown in FIG. 8B, camera 207 would receive the emitted light from the pens as differently shaped inputs, which can permit computing system 200 to uniquely identify the inputs according to the pen providing the input.

In an alternative configuration for light pen 710, which can also be represented by FIG. 8A, different light pens can emit modulating lights in differing patterns. For example, Light Pen A could emit light pulses in a distinct pattern, such as on-on-off, Light Pen B could emit light pulses in an off-off-on pattern, and Light Pen C could emit light pulses in an on-on-on pattern. Computing system 200 can uniquely identify the different light pens by recognizing the pattern emitted by each pen. It is understood that the distinct patterns could be generated in a variety of different ways with a variety of mechanisms. For example, they could be created by modulating the light with higher and lower intensities, different wavelengths or colors, different frequencies, etc., and via combinations of various mechanisms (e.g., on-off pulses combined with pulses at different intensities).

As further shown in FIG. 8A, light pens 810, 812 and 814 can interact with table top 201 at various distances from the table top depending on factors such as the strength of the light being emitted and the sensitivity of camera 207. As with the passive inking instruments discussed above, light pens 810, 812 and 814 can be uniquely identified by the computing system, which can sense the geometric shapes of the emitted lights. The use of geometric shapes can provide additional advantages, such as providing orientation information for the light pen and distance information. When such a light pen is further from the table top, the size of the emitted geometric shape sensed by camera 207 is larger and less defined than when the light pen is in contact with the table top. The size and/or clarity of the sensed shape can be used by the computing system to evaluate the distance of the respective pen from the table top.

Figure 9A:
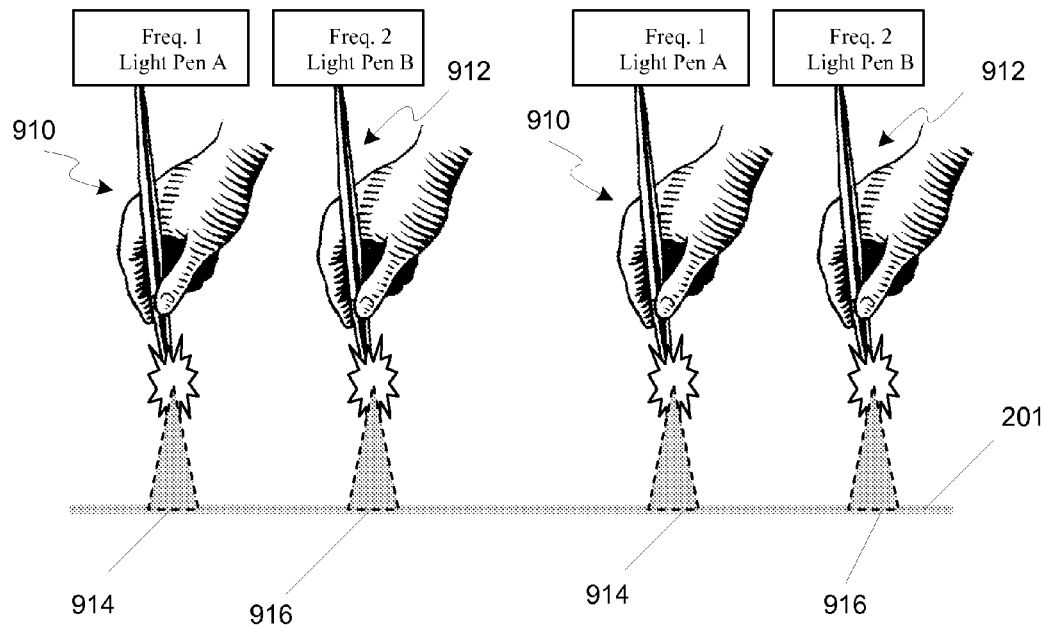
FIGS. 9A and 9B illustrate another example method of interacting with a computing device, such as the interactive table environment and interface of FIG. 2, via one or more active digital inking instruments, such as the active digital inking instrument of FIG. 7.
Figure 9B:
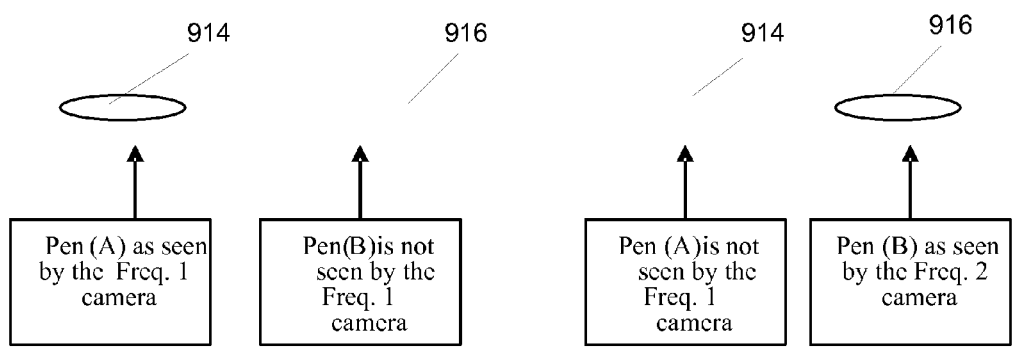

FIGS. 9A and 9B illustrate another example method of interacting with a computing device, such computing device 200, via one or more active digital inking instruments, such as the active digital inking instrument of FIG. 7. As shown in FIG. 9A, a first inking instrument includes Light Pen A 910 emitting light 914 at a first frequency and Light Pen B emitting light 916 at a second frequency different from Light Pen A. Suppose, as an example, that Light Pen A emits infrared light having a wavelength of 800 nm and Light Pen B emits infrared light having a wavelength of 850 nm. Suppose further that camera 207 includes a plurality of cameras including a first camera that senses infrared light at 800 nm and a second camera that senses infrared light at 850 nm. Thus, as shown in FIG. 9B, the first camera could sense inputs from Light Pen A, but not from Light Pen B. Similarly, the second camera could sense inputs from Light Pen B, but not from Light Pen A. As such, computing system 200 could uniquely and simultaneously identify inputs from Light Pen A and from Light Pen B.

Figure 10:
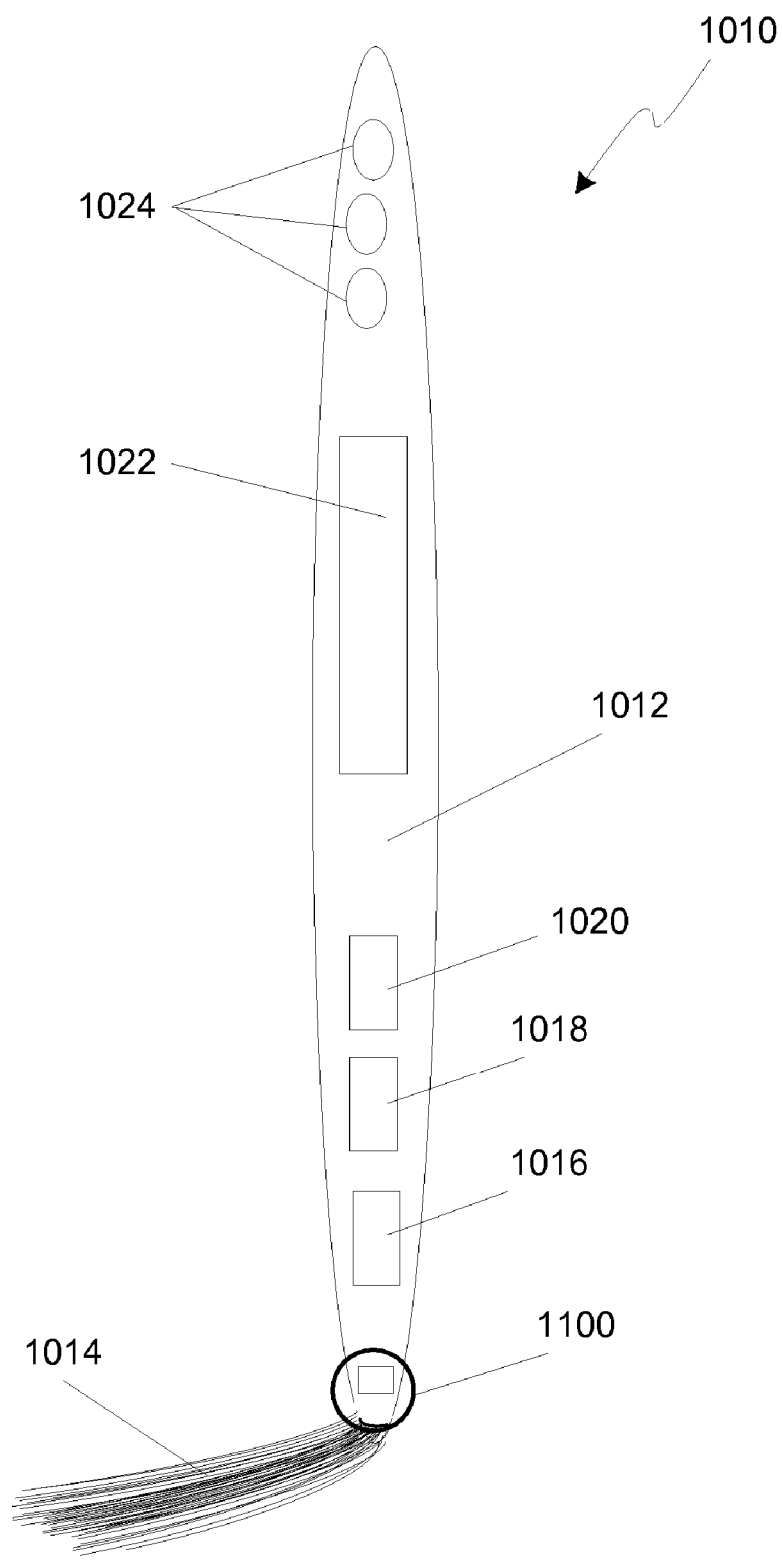
FIG. 10 illustrates another example active digital inking instrument.
Figure 11:
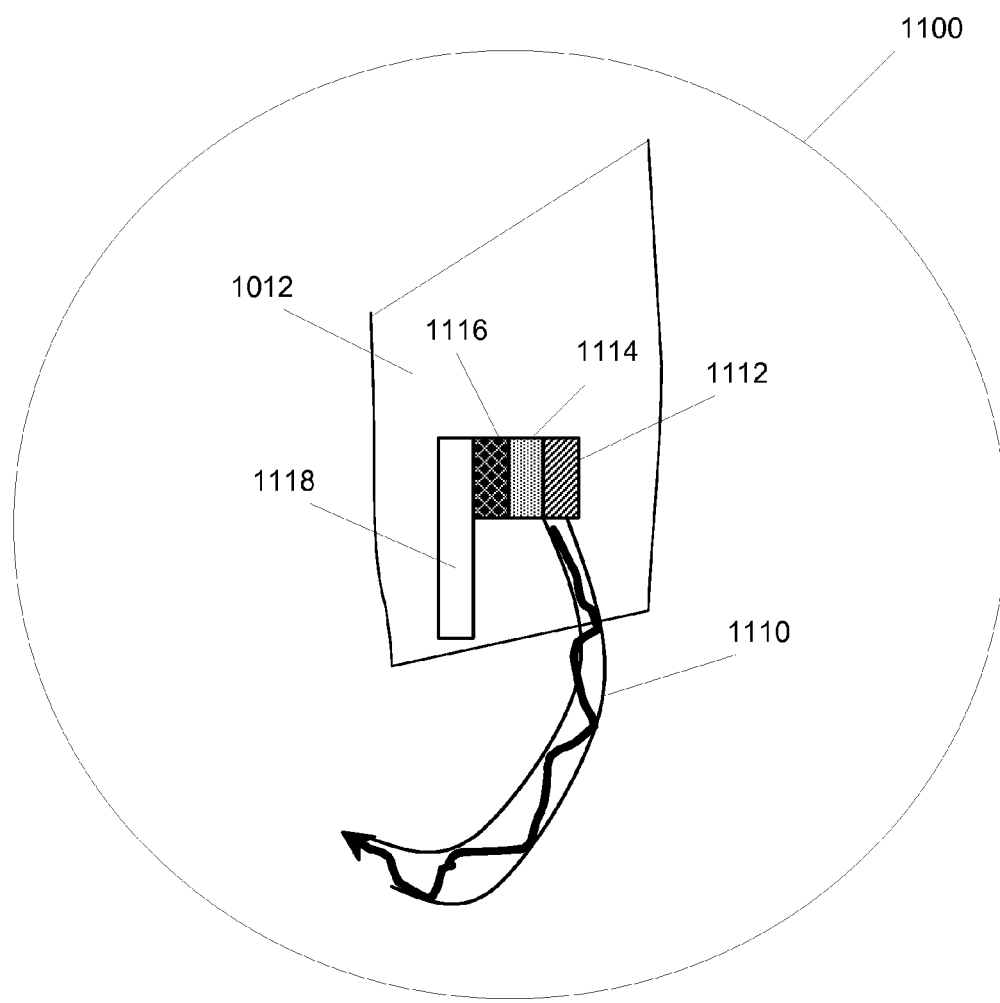
FIG. 11 is a close view of a tip portion of the active digital inking instrument of FIG. 10.

FIG. 10 illustrates another example active digital inking instrument 1010, which generally includes the aspects and preferences of passive inking instrument 500 of FIG. 5, along with the active features described below. Similar to inking instrument 500, inking instrument 1010 is configured as a brush having a handle 1012 and bristles 1014. However, bristles 1014 include both passive reflective bristles (e.g., bristles 506 as discussed along with inking instrument 500) and an arrangement of fiber optic bristles (see FIG. 11). The fiber optic bristles are intermingled with the passive bristles in various arrangements to assist with uniquely identifying the brush and/or visibly identifying to the user the current inking characteristics for the brush (e.g., the current ink color associated with the particular instrument). As shown in FIG. 11, fiber optic bristles 1110 are each connected to a light source 1112, 1114 or 1116 that can illuminate the individual fiber optic bristles as desired. The light sources 1112, 1114 and 1116 can emit light having different characteristics, such as different colors. In one configuration, the light sources emit the primary colors (red, yellow and blue). For instance, light source 1112 can emit red light, light source 1114 can emit yellow light and light source 116 can emit blue light. In addition, the light sources can emit visible and/or non-visible light (e.g., infrared light).

Figure 12A:
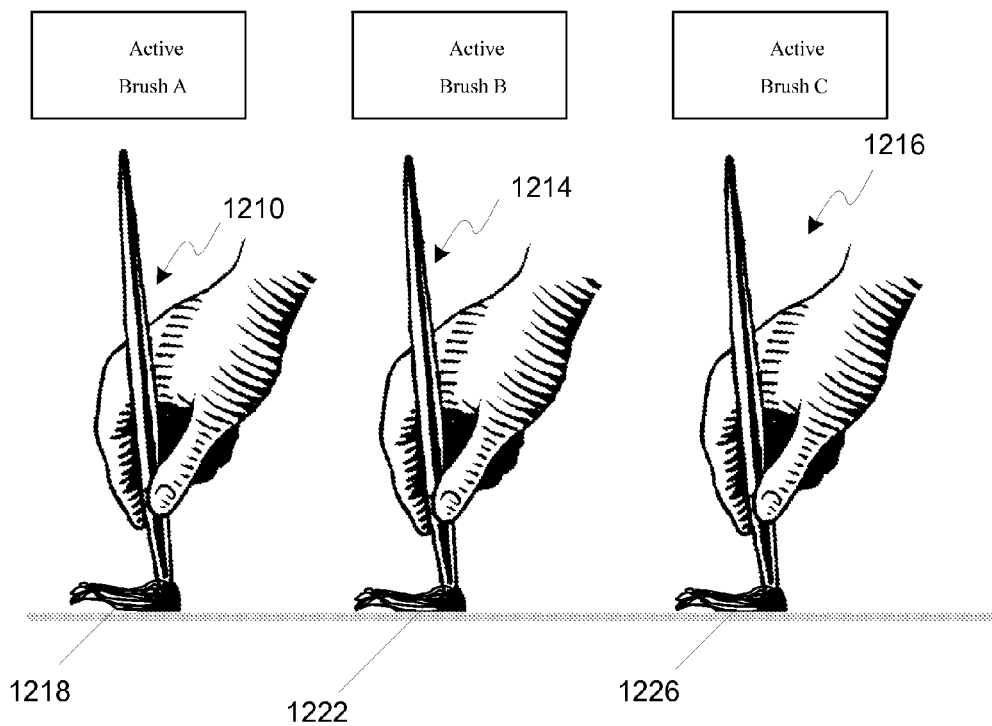
FIGS. 12A and 12B illustrate another example method of interacting with a computing device, such as the interactive table environment and interface of FIG. 2, via one or more active digital inking instruments, such as the active digital inking instrument of FIG. 10.
Figure 12B:
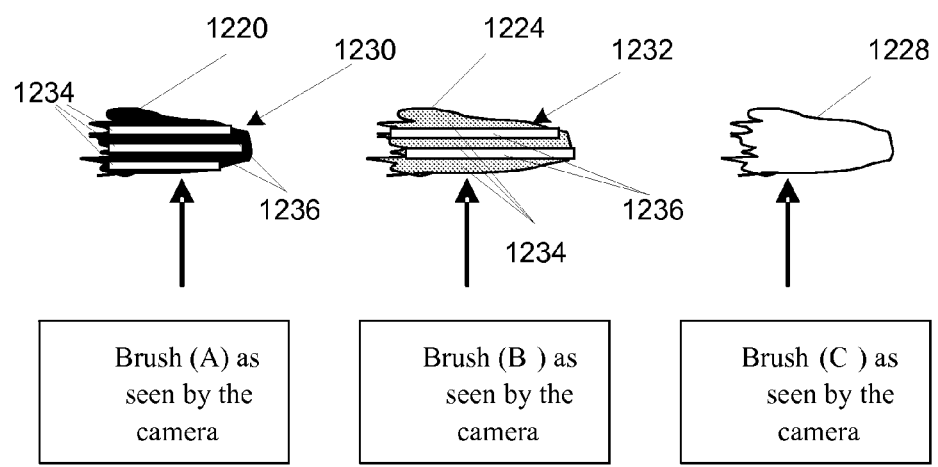

The combination of fiber optic and non-fiber optic bristles can create a wide variety of uniquely identifiable reflective patterns, which can be sensed by camera 207. As illustrated in FIGS. 12A and 12B, selected ones of the fiber optic bristles can be emit light at the same wavelength as emitting device 202 and others can emit light at another wavelength to create an identifiable pattern for camera 207. Thus, a wide variety of unique patterns can be created to identify different inking instruments. For example, in the example illustrated in FIG. 12A, fiber optic fibers 1236 of Brush A are emitting light at the same wavelength and intensity as the reflected light from Brush A being sensed by the camera, while fiber optic fibers 1234 are not emitting light or are doing so at a different wavelength than what is being sensed by camera 207. Fiber optic fibers 1234 of Brush B are emitting light at the same wavelength and intensity as the reflected light from Brush B being sensed by the camera, while fiber optic fibers 1236 are not emitting light or are doing so at a different wavelength than what is being sensed by camera 207. Neither fiber optic fibers 1234 or 1236 on Brush C are emitting light or are doing so at a different wavelength than what is being sensed by camera 207. As such, Brushes A, B and C can be identified via the amount of light being reflected from their bristles and/or via the pattern created by the fiber optic fibers.

Referring back to FIG. 10, inking instrument 1010 can change configurations by illuminating fiber optic fibers in various patterns, colors and configurations. Inking instrument 1010 can include a processor 1016, a receiver 1018, a transmitter 1020, a power source 1022 and/or other mechanisms that can cooperate with each other to power the light sources and to change the configuration of illuminated fiber optic fibers as desired. Inking instrument 1010 may also include inputs 1024 through which the user may select a desired configuration. The ability to selectively illuminate various fiber optic fibers permits a single inking instrument to represent different uniquely identifiable inking instruments depending upon its configuration of illuminated fiber optic fibers. For example, a user could initially use inking instrument 1010 to produce digital ink having a first characteristic, such as a first color. Rather than interacting with the computing system to change the digital ink color, the user could select a different configuration of illuminated fiber optic fibers that are associated with an inking instrument that produces digital ink on the system having a second characteristic (e.g., a second color). Thus, the user could use a single instrument to represent different uniquely identifiable instruments as sensed by the computing system.

In addition, the fiber optic fibers could provide the added benefit of emitting visible light along with non-visible light (e.g., infrared light). As such, the fiber optic fibers could emit visible light to identify the current configuration of the inking instrument to the user, while also emitting infrared light for identifying the inking instrument to the system. For instance, some of the fiber optic fibers could emit red light to visibly indicate to the user that the inking instrument is currently associated with red digital ink on the computing system.

Fiber optic bristles can provide the further benefit of sensing inputs from the computing system or from other sources. For example, table top 201 could display a palette of colors. The user could place inking instrument 1010 in contact with, or proximate to, a desired color on the palette while inking instrument 1010 is in a color-sense mode. The desired color on the palette could be sensed by the inking instrument via light received at the fiber optic fibers to identify the color selected on the palette. The fiber optic bristles could thereafter illuminate one or more visible lights and visibly identify to the user the ink color currently associated with the inking instrument. The computing system could also sense user-selection of the color from the display and associate that color with the inking instrument. Alternatively, signals received at sensor 1118 (FIG. 11) or via receiver 1018 (FIG. 10) from computing system 200 could identify a selected color or other inking characteristic to the inking instrument, which could visibly indicate the selected color to the user by illuminating appropriate fiber optic fibers.

Using one or more of the features and approaches described above, one or more user's interaction with a computing device can be improved. Although the description above provides illustrative examples and methods, it should be understood that the various examples and sequences may be rearranged, divided, combined and subcombined as desired. Accordingly, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim the following:

1. A method of an inking instrument interacting with a computing device to generate digital ink, the method comprising:
   receiving a particular light at an inking instrument from a light emitting device;
   receiving input at the inking instrument selecting a light configuration to be generated by the inking instrument and at a time in which the inking instrument is in a color-sense mode, wherein the inking instrument comprises:
   a handle;
   a first light source and a second light source connected to the handle, wherein light that is generated by the first light source is visible light and light that is generated by the second light source is non-visible light; and
   bristles attached to the handle, comprising fiber optic bristles operably connected to at least the first light source and the second light source, and passive reflective bristles comprising a material that reflects the particular light with one or more first characteristics, wherein some of the fiber optic bristles are connected to the first light source to emit the visible light generated by the first light source and some other of the fiber optic bristles are connected to the second light source to emit the non-visible light generated by the second light source; with one or more second characteristics, and wherein the first and second characteristics enable the computing device to identify the light configuration of the inking instrument;
   based on the received input, selecting the light configuration and illuminating the first light source and the second light source according to the selected light configuration, thereby generating visible light from the first light source and non-visible light from the second light source, to emit the visible light and the non-visible light from the fiber optic bristles;
   simultaneously reflecting the particular light from the reflective bristles and emitting the generated visible and non-visible light from the fiber optic bristles proximate a display of a computing system, wherein the visible light indicates the light configuration to a user, and wherein the reflected particular light and the non-visible light have the first and second characteristics, respectively, and are received by one or more light sensing devices of the computing system, and which causes the computing system to:
   detect a location of the inking instrument relative to the display;
   identify the light configuration of the inking instrument based on the first and second characteristics; and
   display digital ink at the display with a first distinguishing feature corresponding directly to the selected light configuration, and corresponding to the location of the inking instrument.

2. The method recited in claim 1, wherein the first light source and second light source are configured to generate and emit a plurality of different wavelengths of light.

3. The method recited in claim 2, wherein the first light source and second light source include a plurality of distinct light sources.

4. The method recited in claim 1, wherein the inking instrument includes a plurality of input controls for selectably controlling which of a plurality of different available light configurations are selected as the selected light configuration.

5. The method recited in claim 4, wherein the received input is manually entered by the user via at least one of the plurality of input controls.

6. The method recited in claim 1, wherein the method further includes the inking instrument receiving the received input from the computing system in response to the inking instrument being placed proximate a color palette display that is provided by a computing system.

7. An inking instrument that is configured to interact with a computing device to generate digital ink, the inking instrument comprising:
   a handle,
   at least a first light source and a second light source connected to the handle, wherein light that is generated by the first light source is visible light and light that is generated by the second light sources is non-visible light;
   bristles attached to the handle, comprising fiber optic bristles operably connected to at least the first light source and the second light source, and passive reflective bristles intermingled with the fiber optic bristles comprising a material that reflects a particular light with one or more first characteristics, wherein some of the fiber optic bristles are connected to the first light source to emit the visible light generated by the first light source and some other of the fiber optic bristles are connected to the second light source to emit the non-visible light generated by the second light source with one or more second characteristics, wherein the particular light is reflected simultaneously with the emission of the visible light that is generated by the first light source, and wherein the first and second characteristics enable the computing device to detect a location of the inking instrument and to identify the light configuration of the inking instrument; and
   a plurality of input controls that selectably control which of a plurality of different light configurations are generated by the first light source and second light source and that are thereafter emitted from the fiber optic bristles, wherein each of the available configurations of light comprises visible and non-visible light being generated.

8. An inking instrument as recited in claim 7, wherein the first light source and second light source include a plurality of distinct lights that each generate a different wavelength of light.

* * * * *

UNITED STATES PATENT AND TRADEMARK OFFICE
CERTIFICATE OF CORRECTION

| | | |
|---|---|---|
| PATENT NO. | : 7,791,597 B2 | Page 1 of 1 |
| APPLICATION NO. | : 11/382812 | |
| DATED | : September 7, 2010 | |
| INVENTOR(S) | : Dana Lu Silverstein et al. | |

It is certified that error appears in the above-identified patent and that said Letters Patent is hereby corrected as shown below:

In column 11, line 29, in Claim 1, delete "source;" and insert -- source --, therefor.

In column 11, line 48, in Claim 1, delete "system," and insert -- system --, therefor.

Signed and Sealed this
Tenth Day of May, 2011

David J. Kappos
*Director of the United States Patent and Trademark Office*